United States Patent

Wang et al.

(10) Patent No.: US 9,450,718 B2
(45) Date of Patent: Sep. 20, 2016

(54) METHOD AND APPARATUS FOR ESTIMATING CHANNEL QUALITY INFORMATION, BASE STATION AND NETWORK CENTRAL PROCESSING DEVICE

(75) Inventors: Gang Wang, Beijing (CN); Ming Lei, Beijing (CN)

(73) Assignee: NEC (China) Co., Ltd., Beijing (CN)

( * ) Notice: Subject to any disclaimer, the term of this patent is extended or adjusted under 35 U.S.C. 154(b) by 0 days.

(21) Appl. No.: 14/345,579

(22) PCT Filed: Feb. 24, 2012

(86) PCT No.: PCT/CN2012/071575
§ 371 (c)(1),
(2), (4) Date: Aug. 28, 2014

(87) PCT Pub. No.: WO2013/123671
PCT Pub. Date: Aug. 29, 2013

(65) Prior Publication Data
US 2014/0369219 A1    Dec. 18, 2014

(51) Int. Cl.
*H04L 5/00*    (2006.01)
*H04W 24/08*    (2009.01)
*H04B 7/02*    (2006.01)
(Continued)

(52) U.S. Cl.
CPC .............. *H04L 5/0035* (2013.01); *H04B 7/024* (2013.01); *H04B 7/0617* (2013.01); *H04L 1/20* (2013.01); *H04W 24/08* (2013.01); *H04L 1/1829* (2013.01)

(58) Field of Classification Search
CPC combination set(s) only.
See application file for complete search history.

(56) References Cited

U.S. PATENT DOCUMENTS

2010/0273499 A1    10/2010    Van Rensburg et al.
2010/0322351 A1    12/2010    Tang et al.
(Continued)

FOREIGN PATENT DOCUMENTS

CN    101834701 A    9/2010
CN    102291740 A    12/2011
(Continued)

OTHER PUBLICATIONS

Communication dated Jul. 28, 2015 from the Japanese Patent Office in counterpart application No. 2014-546276.
(Continued)

*Primary Examiner* — Jung-Jen Liu
(74) *Attorney, Agent, or Firm* — Sughrue Mion, PLLC

(57) ABSTRACT

The present invention provides a method and apparatus for estimating channel quality information, a base station and a network central processing device. According to the embodiments of the present invention, a macro cell includes multiple transmission points, the method can comprise receiving the channel quality information which is measured by a user equipment based on a cell specific reference signal; obtaining channel matrix information the multiple transmission points; calculating beamforming information on a single cell transmission and a coordinated multi-point transmission based on the channel matrix information; and estimating the channel quality information for the single cell transmission and the coordinated multi-point transmission based on the channel quality information, the channel matrix information, and the beamforming information. With embodiments of the present invention, it is possible to provide coordinated multi-point gains with no overhead introduced and it is compatible with the existing available user equipments.

20 Claims, 10 Drawing Sheets

(51) Int. Cl.
*H04B 7/06* (2006.01)
*H04L 1/20* (2006.01)
*H04L 1/18* (2006.01)

(56) References Cited

U.S. PATENT DOCUMENTS

| | | | | |
|---|---|---|---|---|
| 2012/0120842 A1* | 5/2012 | Kim | ................. | H04B 7/024 370/252 |
| 2012/0120903 A1* | 5/2012 | Kim | ................. | H04B 7/024 370/329 |
| 2012/0202541 A1* | 8/2012 | Koo | ................. | H04L 1/20 455/501 |
| 2012/0218968 A1* | 8/2012 | Kim | ................. | H04L 5/0053 370/329 |
| 2012/0282964 A1* | 11/2012 | Xiao | ................. | H04B 7/024 455/515 |
| 2013/0039203 A1* | 2/2013 | Fong | ................. | H04B 7/024 370/252 |
| 2013/0083681 A1* | 4/2013 | Ebrahimi Tazeh Mahalleh | ................. | H04L 5/0057 370/252 |
| 2013/0114428 A1* | 5/2013 | Koivisto | ................. | H04B 7/024 370/252 |
| 2013/0114430 A1* | 5/2013 | Koivisto | ................. | H04B 7/024 370/252 |
| 2013/0114536 A1* | 5/2013 | Yoon | ................. | H04L 5/0051 370/329 |
| 2013/0208604 A1* | 8/2013 | Lee | ................. | H04L 25/0226 370/252 |
| 2013/0242778 A1* | 9/2013 | Geirhofer | ................. | H04L 1/0026 370/252 |
| 2013/0242902 A1* | 9/2013 | Liu | ................. | H04W 24/10 370/329 |
| 2013/0258896 A1* | 10/2013 | Park | ................. | H04W 72/085 370/252 |
| 2013/0294352 A1* | 11/2013 | Park | ................. | H04B 7/024 370/328 |
| 2013/0315189 A1* | 11/2013 | Kim | ................. | H04L 1/0026 370/329 |

FOREIGN PATENT DOCUMENTS

| | | |
|---|---|---|
| WO | 2010/050718 A2 | 5/2010 |
| WO | 2011/155763 A2 | 12/2011 |

OTHER PUBLICATIONS

Intel Corporation, "On CSI-RS configuration/reconfiguration", 3GPP TSG-RAN WG1 Meeting #66, R1-112221, Aug. 2011.
International Search Report of PCT/CN2012/071575, dated Nov. 29, 2012.
Communication dated May 27, 2015 from the European Patent Office in counterpart application No. 12869348.8.

* cited by examiner

METHOD AND APPARATUS FOR ESTIMATING CHANNEL QUALITY INFORMATION, BASE STATION AND NETWORK CENTRAL PROCESSING DEVICE

CROSS REFERECNE TO RELATED APPLICATIONS

This application is a National Stage of International Application No. PCT/CN2012/071575 filed Feb. 24, 2012, the contents of all of which are incorporated herein by reference in their entirety.

FIELD OF THE INVENTION

Embodiments of the present invention generally relate to the field of mobile communication technology, and more particularly, to a method and apparatus for estimating channel quality information, a base station and a network central processing device.

BACKGROUND OF THE INVENTION

With the constant increase of mobile data services and emergence of new-type applications, the 3rd Generation Partnership Project (3GPP) organization has developed long-term evolution (LTE) specifications and LTE-Advanced (LTE-A) specifications. As the next generation cellular communication standard, an LTE or LTE-Advance system can operate in both Frequency Division Duplex (FDD) mode and Time Division Duplex (TDD) mode. In the FDD mode, the uplink and downlink employ a pair of frequency spectrums for data transmission; while in the TDD mode, the uplink and downlink channels share the same frequency, but occupy different time slots. Therefore, the TDD system has channel reciprocity, by which the downlink wireless channel information could be obtained with the knowledge got from the uplink channel.

Coordinated Multi-Point (CoMP) is one of the most important technologies for an LTE-A system to improve the cell edge User Equipment (UE)'s performance. In existing LTE-A specifications, there are defined four scenarios, wherein, for scenario 4, besides the macro eNB, the macro cell also includes several Remote Radio Headers (RRH) as transmission points, which share the same cell ID with the macro eNB.

Furthermore, the heterogeneous network (HetNet) with low power RRHs can further improve the cell throughput performance by decreasing the transmission distance between the transmitter and receiver. However, with shorter transmission range, the inter-cell interference among the RRHs is also increased, which decrease the performance, especially for those cell edge UEs. In such a case, CoMP is expected to be able to coordinate the data transmission among the RRHs together with the macro eNB, so that the cell edge UE's performance can be guaranteed.

FIG. 1 schematically illustrates a diagram of a system structure under scenario 4 in the prior art, which also shows the exemplary CoMP scenario. As illustrated in FIG. 1, in the macro cell shown in a solid ellipse, there are one macro eNB, four RRHs (i.e., RRH 0, RRH 1, RRH 2 and RRH 3) which are connected to the macro eNB by fibers, and four UEs (i.e., UE 0, UE 1, UE 2 and UE 3 ). In the macro cell, UE 0 is served by RRH 0; UE 1 can be served by RRH 1 and RRH 2 at the same time, wherein RRH 1 and RRH 2 constitute a cooperating set for UE 1; UE 2 can be served by RRH 3 and the macro eNB which constitute a cooperating set for UE 2; and UE 3 is served directly by the macro eNB. Therefore, in such a scenario, a UE can be served by a single transmission point or multiple transmission points in a cooperating set, but all of these transmission points share the same cell ID.

In 3GPP TS 36.213, there is defined a procedure of UE channel measurement and eNB scheduling, and for the purpose of illustration, the procedure is schematically shown in FIG. 2A. As illustrated, at step S201, UE measures the channel quality information (CQI) based on cell specific reference signal (CRS) that is sent from the eNB in a certain resource element (RE). For the TDD system and the transmission mode 7, 8 or 9, when PMI (Precoding Matrix Indicator)/RI (Ranking Indicator) reporting is disabled, the UE shall derive the channel measurement for computing CQI based on the CRS. The CRS is a pre-defined signal, pre-known to both the transmitter and the receiver, and thus the UE can derive the downlink channel CQI based on the received CRS. Then at step S202, UE reports the measured CQI as feedback information to the eNB through Physical Uplink Control Channel PUCCH (for periodic reporting) or through Physical Uplink Shared Channel PUSCH (for aperiodic reporting). After receiving the reported CQI, the eNB will schedule UEs in each TTI, based on the CQI, at step S203. The exemplary scheduling solutions can include, for example, Max C/I, round robin, proportional fairness and etc., which are well known in the art and thus will not be elaborated herein for the purpose of simplification. Then, the eNB will allocate resource blocks (RB) to the UE based on the scheduling results so as to send packets to the UE.

FIG. 2B schematically illustrates a diagram of mapping of downlink cell specific reference signals for two antenna ports and normal CP under 3GPP TS 36.211. In this figure, each block represents a resource element (RE), and in order to prevent the interference between the two ports, the resource elements which are used in antenna port 1 are not used for transmission in antenna port 0, and vice versa, as shown in FIG. 2B.

However, for the scenario 4 as mentioned hereinabove, wherein all transmission points share the same cell ID, such a solution is not appropriate. In such a scenario, all transmission points will send identical CRS, which causes that the UE can not differentiate these different transmission points in a macro cell at all. This means that the calculated CQI is overestimated and the reported CQI might even lead to a transmission failure, especially for those cell edge UEs.

Besides, in Chinese Patent Application No. 201110234923.X, entitled with "A Method and Apparatus for transmitting CQI", and filed by Applicant CATR with the CSIPO on Aug. 16, 2011, there is disclosed a procedure of UE channel measurement and CQI-recalculation, which is schematically shown in FIG. 3A for the purpose of illustration. As illustrated in FIG. 3A, at step S301, UE receives channel state information reference signals (CSI-RS) from multiple points, wherein each transmission point will transmit a different CSI-RS to the UE. At step S302, the UE measures CQI for each of transmission points based on the received CSI-RS. Particularly, the measured CQIs include CQI for the main transmission point to UE and the CQIs for coordinated transmission points to UE. Specifically, the CQI for the main transmission point is the signal to noise plus interference (SINR) and the CQI for other coordinated transmission points are the relative CQIs to the main transmission point. The UE reports the measured CQIs to the eNB at step S303. Then, the eNB would re-calculate CQI based on reported CQI at step S304. Particularly, the eNB firstly modifies the UE's channel matrix with the help of the relative CQI measured in step S302; then, it calculates the noise and interference based on the CQI of the main transmission point; and lastly, it re-calculates the CQI by taking the number of co-scheduled UEs in the CoMP set into account.

FIG. 3B schematically illustrates a diagram of mapping of CSI-RS for eight antenna ports, CSI configuration 0 and normal CP under 3GPP TS 36.211, wherein CRS configuration is omitted for a reason of simplification. As illustrated, for each antenna port, only two REs are used to transmit CSI reference signal. Therefore, it is clear from FIG. 2B and FIG. 3B that CSI-RS is much sparser than CRS in time and frequency, which will lead to a coarse interference measurement.

On the other hand, in the disclosed solution, the CQIs are measured based on different CRI-RS from multiple transmission points and there will be a large number of CQIs to be reported. Therefore, the uplink overhead is significantly increased. In addition, the CSI-RS itself introduces extra downlink overhead.

Moreover, it is the most important that, under the current standard (3GPP TS 36.213), it requires the UE to calculate CQI based on CRS when PMFRI report is disabled but this disclosed solution does not support it at all. In addition, the introduction of the CSI-RS means the modification to the UE and thus it is incompatible with existing available UEs, for example those UEs measuring CQI based on CRS.

Therefore, there is urgently needed a new CQI estimation scheme in the art.

SUMMARY OF THE INVENTION

In view of the foregoing, the present invention provides a new estimating channel quality information so as to solve or at least partially mitigate at least a part of problems in the prior art.

According to an aspect of the present invention, there is provided a method of estimating channel quality information, wherein a macro cell includes multiple transmission points, the method can comprise: receiving the channel quality information which is measured by a user equipment based on a cell specific reference signal; obtaining channel matrix information for the multiple transmission points; calculating beamforming information on a single cell transmission and a coordinated multi-point transmission based on the channel matrix information; and estimating the channel quality information for the single cell transmission and the coordinated multi-point transmission based on the channel quality information, the channel matrix information, and the beamforming information.

In an embodiment of the present invention, the beamforming information can comprise the beamforming matrix information and the beamforming gain information, and the estimating the channel quality information for the single cell transmission and the coordinated multi-point transmission can comprise: estimating the noise and interference from outside of the macro cell based on the channel quality information, the channel matrix information, and antenna virtualization matrix information for the multiple transmission points; estimating the noises and interferences from the inside of the macro cell for the single cell transmission and the coordinated multi-point transmission based on the channel matrix information and the beamforming matrix information; and calculating the channel quality information for the single cell transmission and the coordinated multi-point transmission based on the beamforming gain information, the noise and interference from the outside of the macro cell, and the noises and interferences from the inside of the macro cell for the single cell transmission and the coordinated multi-point transmission.

In another embodiment of the present invention, the method can further comprise: obtaining receive power information on the multiple transmission points; and the channel matrix information can comprise the channel matrix normalized based on the receive power information relative to receive power of one of multiple transmission points for the coordinated multi-point transmission.

In a further embodiment of the present invention, the one of the multiple transmission points can be a serving point of the user equipment which is selected from the multiple transmission points based on the receive power information.

In a still further embodiment of the present invention, the method can further comprise determining a cooperating set of the user equipment for the coordinated multi-point transmission.

In a still yet further embodiment of the present invention, the cooperating set of the user equipment can be determined based on receive power information on the multiple transmission points.

In another embodiment of the present invention, the obtaining channel matrix information on the multiple transmission points can comprise receiving the channel matrix information from the multiple transmission points, and the channel matrix information can be measured by the multiple transmission points based on the SRS transmitted by the user equipment.

In a further embodiment of the present invention, the method can further comprise: scheduling the user equipment based on the estimated channel quality information for the single cell transmission and the coordinated multi-point transmission; and sending a scheduling result to the multiple transmission points.

In a still further embodiment of the present invention, the method can further comprise: re-estimating the channel quality information for the single cell transmission and the coordinated multi-point transmission based on the beamforming information which is obtained during scheduling the user equipment.

In a still yet further embodiment of the present invention, the method can further comprise modifying the channel quality information for the single cell transmission and the coordinated multi-point transmission with an adjustment factor in response to a transmission result fed back from the user equipment.

According to another aspect of the present invention, there is provided an apparatus for estimating channel quality information, wherein a macro cell includes multiple transmission points, the apparatus can comprise: channel quality information receiving unit for receiving the channel quality information which is measured by a user equipment based on cell specific reference signal; channel matrix information obtaining unit for obtaining channel matrix information for the multiple transmission points; beamforming information calculation unit for calculating beamforming information on a single cell transmission and a coordinated multi-point transmission based on the channel matrix information; and channel quality information estimation unit for estimating the channel quality information for the single cell transmission and the coordinated multi-point transmission based on the channel quality information, the channel matrix information, and the beamforming information.

According to a further aspect of the present invention, there is provided a base station which comprises the apparatus of the another aspect mentioned herein above.

According to a still further aspect of the present invention, there is provided a network central processing device which comprises the apparatus of the another aspect mentioned herein above.

With embodiments of the present invention, there is provided a solution for CQI estimation which is especially suitable for the scenario 4 mentioned in the background and it is possible to provide coordinated multi-point gains with no overhead introduced and it is compatible with the existing available user equipments.

BRIEF DESCRIPTION OF THE DRAWINGS

The above and other features of the present invention will become more apparent through detailed explanation on the embodiments as illustrated in the embodiments with reference to the accompanying drawings throughout which like reference numbers represent same or similar components and wherein.

DETAILED DESCRIPTION OF EMBODIMENTS

Hereinafter, a method and apparatus for estimating channel quality information, a base station and a network central processing device will be described in detail through embodiments with reference to the accompanying drawings. It should be appreciated that these embodiments are presented only to enable those skilled in the art to better understand and implement the present invention, not intended to limit the scope of the present invention in any manner.

It should be first noted that this invention is illustrated in particular sequences for performing the steps of the methods. However, these methods are not necessarily performed strictly according to the illustrated sequences, and they can be performed in reverse sequence or simultaneously based on natures of respective method steps. Beside, the indefinite article "a/an" as used herein does not exclude a plurality of such steps, units, devices, and objects, and etc.

Hereinafter, reference will be first made to FIG. 4 to describe the method of estimating CQI according to an embodiment of the present invention.

Figure 4:
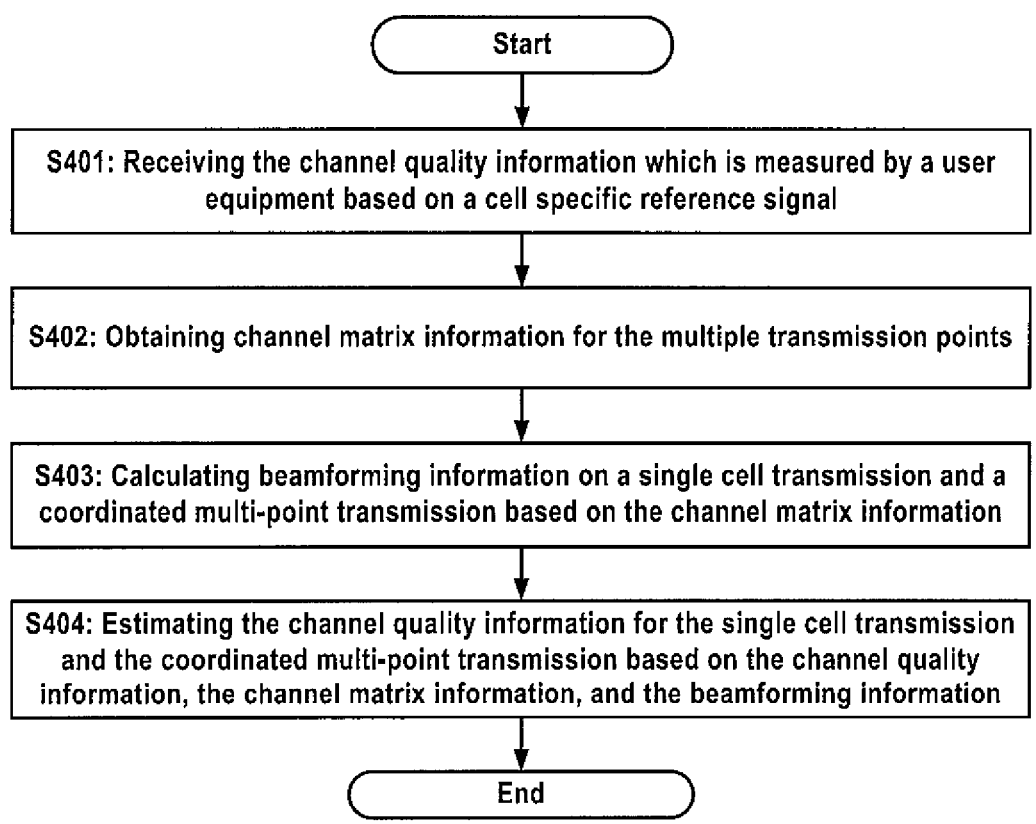
FIG. 4 schematically illustrates a flow chart of a method for estimating channel quality information according to an embodiment of the present invention.

As illustrated in FIG. 4, first at step S401, the CQI information is received by the macro eNB. In the present invention, the CQI information is measured by a UE based on the CRS and reports to the measured CQI to for example the macro eNB. The measurement operation is exactly identical to the operation for example specified under 3GPP TS 36.213, which means that the solution of the present invention requires no modification to the UE and thus it is compatible with those current available UEs. However, as mentioned in the above, all transmission points in the macro will send identical CRS to the UE, which causes that the UE can not differentiate these different transmission points. This means that the calculated CQI is overestimated and the reported CQI might even lead to a transmission failure, especially for those cell edge UEs. Therefore, the reported CQI needs to be modified or re-calculated by for example the macro eNB, or other suitable device.

Next, at step S402, channel matrix information for the multiple transmission points (N) is obtained as so to provide basis information for calculating beamforming information. In an embodiment of the present invention, UE will transmit sounding reference signals (SRS) to each of the transmission points in the macro cell, and each transmission point measures the channel response to the uplink SRS. Then the transmission points will report the measured channel matrix information to the macro eNB. Therefore, the channel matrix information can be received from the multiple transmission points. For a TDD system, the uplink and downlink channels share the same frequency, but occupy different time slots, and thus the TDD system has channel reciprocity, by which the downlink channel information could be obtained with the knowledge got from the uplink channel. This means that the beamforming information for the downlink channel can be calculated from the uplink channel matrix information.

In a preferable embodiment of the present invention, the macro eNB can further obtain from the multiple transmission points the receive power information on the multiple transmission points. In such a case, the channel matrix information can be further normalized based on the receive power information relative to the receive power of one of transmission points for the coordinated multi-point transmission. For a coordinated multi-point transmission, eNB will receive several channel matrices which correspond to the channels from the UE to respective transmission points in the cooperating set for the coordinated multi-point transmission, and each transmission point might have different receive power. Therefore, it is preferable if each channel matrix is normalized relative to one of the transmission points in the cooperating set.

The cooperating set can be determined in any suitable manner. For example, in an embodiment of the present invention, transmission points located with in a certain location range can be determined as a cooperating set. In another embodiment of the present invention, the cooperating set for the coordinated multi-point transmission can be determined based on the receive power information on the multiple transmission points. Particularly, it can limit the power difference, only those transmission points that have power differences within a predetermined threshold range can be selected as transmission points for forming a cooperating set. Additionally, the size of the cooperating set can also be limited, for example, the maximum number of transmission points which can be comprised in a cooperating set can be determined as M in advance, that is to say, at most M transmission points which satisfies the predetermined threshold condition can be selected as points in a cooperating set.

Therefore, for a coordinated multi-point transmission, the channel matrices can be normalized and form a concatenated channel matrix for example as follows:

$$H_i = \left[H_{i,0}, \sqrt{\frac{P_{i,1}}{P_{i,0}}} H_{i,1}, \ldots, \sqrt{\frac{P_{i,1}}{P_{i,0}}} H_{i,j} \ldots \sqrt{\frac{P_{i,M-1}}{P_{i,0}}} H_{i,M-1}\right] \quad \text{(Equation 1)}$$

wherein i denotes the index of UE; $H_{i,j}$ denotes to the matrix of channel from UE i to the transmission point 1 in the cooperating set; $P_{i,0}$ denotes the receive power from the UE i to the transmission point 0 which is selected as the normalization reference point and can be any one of the transmission points in the cooperating set, and it is preferable if the severing point for the UE i is selected as the normalization reference point. The serving point can be a transmission point selected from the multiple points in a cooperating set based on the receive power information, and for example the transmission point with the maximum receive power information can be taken as the serving point.

After that, beamforming information on a single cell transmission and a coordinated multi-point transmission can be calculated based on the obtained channel matrix information. Particularly, the beaforming matrix $W_{i,0}$ and the beamforming gain $\sigma^2_{i,0}$ for the single cell transmission can be calculated based on the channel matrix information on the UE to the single transmission point, and the beaforming matrix $W_i$ and the beamforming gain $\sigma^2_i$ for the coordinated multi-point transmission can be calculated based on the channel matrix information on the UE to each of the multiple coordinated transmission points, for example the concatenated channel matrices as given in Equation 1.

The beamforming information can comprise the beamforming matrix information and the beamforming gain information, which can be obtained through performing eigenvalue extraction to the channel matrix information.

In an embodiment of the present inventor, the eigenvalue may be extracted by a method of singular value decomposition (SVD). According to this embodiment, a m×k channel matrix H(n) may be expressed as $$H = U \Lambda V^H \quad \text{(Equation 2)}$$

where U denotes a m×m matrix, V denotes a k×k matrix, and $\Lambda$ denotes a m×k matrix. Both U and V are unitary matrix, i.e., respective lines of the matrix have a unit length and are mutually orthogonal, therefore $UU^{T}=I$ and $VV^{T}=I$. $\Lambda$ is a diagonal matrix, where each diagonal element is non-negative, and elements ranking top are in a front position. It may be expressed as:

$$\Lambda = \text{diag}[\delta_1, \delta_2, \ldots] \quad \text{(Equation 3)}$$

where $\delta_1$, $\delta_2$, ... are singular values of this matrix, and $\delta_1^2$, $\delta_2^2$, ... are eigen values corresponding to beamforming gains. V is a unitary matrix which corresponds to the beamforming matrix.

Thus, it is quite clear that matrices $\Lambda$ and V can be derived through matrix transformation based on the Equation 2, and further each eigen value corresponding to the beamforming gain is further obtained from $\Lambda$. In such a way, the beamforming matrix and beamforming gain can be calculated based on the channel matrix information.

In addition, the beamforming matrix information and the beamforming gain information may also be obtained using eigen value decomposition (EVD) or any other suitable approach. For the purpose of the simplification, the detailed operation related to EVD will not be elaborated herein.

Reference is made back to FIG. 4, at step S404, the channel quality information for the single cell transmission and the coordinated multi-point transmission is estimated based on the channel quality information, the channel matrix information, and the beamforming information. Hereinafter, reference will be made to FIG. 5 to describe a specific exemplary embodiment of estimating the channel quality information for the single cell transmission and the coordinated multi-point transmission according to an embodiment of the present invention.

Figure 5:
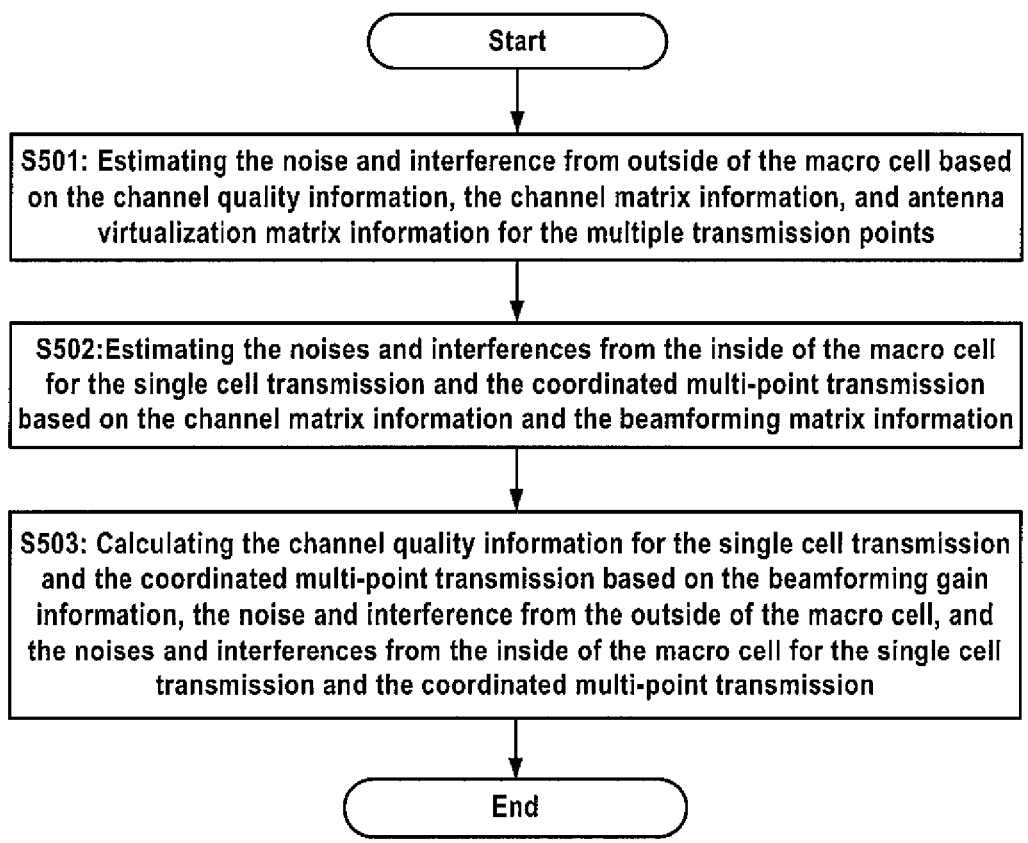
FIG. 5 schematically illustrates a flow chart of the approach for estimating the channel quality information for the single cell transmission and the coordinated multi-point transmission according to an embodiment of the present invention.

As illustrated in FIG. 5, firstly, at step S501, the noise and interference from outside of the macro cell is estimated based on the channel quality information, the channel matrix information, and antenna virtualization matrix information for the multiple transmission points.

For the UE in a macro cell, it will receive noise and interference from the outside of the macro cell. That noise and interference from outside of the macro cell can be estimated from the received channel quality information, the obtained channel matrix information, and antenna virtualization matrix information for the multiple transmission points. It is known that CQI and SINR have a mapping relationship therebetween, and thus the reported CQI can be translated into SINR based on CQI-SINR mapping curve. Then, the noise and interference from outside of the macro cell $I_{out,i}$ can be given for example as follows:

$$I_{out,i} = \frac{\|H_i \overline{W}_i\|^2}{SINR_i} \quad \overline{W}_i = \begin{bmatrix} \overline{W}_{i,0} \\ \overline{W}_{i,1} \\ \ldots \\ \overline{W}_{i,N-1} \end{bmatrix} \quad \text{(Equation 4)}$$

where $H_i$ denotes the channel matrix of UE i, $\overline{W}_{i,j}$ denotes the antenna virtualization matrix for the transmission point j, and SINR is translated from the reported CQI. The antenna virtualization matrix is a predetermined parameter for a wireless communication system. Although different communication vendors may have different antenna virtualization matrices, a certain vendor will have a given antenna virtualization matrix. Hence, the antenna virtualization matrix is available.

Then, at step S502, the noises and interferences from the inside of the macro cell for the single cell transmission and the coordinated multi-point transmission are estimated based on the channel matrix information and the beamforming matrix information.

Within a macro cell, for the single cell transmission, the UE will also receive the noise and interference from other transmission points, and that noise and interference $I_{in,i,0}$ can be estimated for example follows:

$$I_{in,i,0} = \sum_{j=0, j \neq i}^{N} \left\| \sqrt{\frac{P_{i,j}}{P_{i,0}}} H_{i,j} \tilde{W}_j \right\|^2 \quad \text{(Equation 5)}$$

where $\tilde{W}_j$ is the beamforming matrix used by transmission point j.

Similarly, for the coordinated multi-point transmission, the UE will receive the noise and interference from other transmission points than those in the cooperating set, and the noise and interference $I_{in,i,1}$ can be estimated by for example the following equation:

$$I_{in,i,1} = \sum_{j \notin cooperating\ set}^{N} \left\| \sqrt{\frac{P_{i,j}}{P_{i,0}}} H_{i,j} \tilde{W}_j \right\|^2 \quad \text{(Equation 6)}$$

where $\tilde{W}_j$ is also the beamforming matrix used by transmission point j.

After that, at step S503, the channel quality information for the single cell transmission and the coordinated multi-point transmission is calculated based on the beamforming gain information, the noise and interference from the outside of the macro cell, and the noises and interferences from the inside of the macro cell for the single cell transmission and the coordinated multi-point transmission.

After obtaining the noise and interference from outside of the macro cell and the noises and interferences from the inside of the macro cell for the single cell transmission and the coordinated multi-point transmission. The CQI for the single cell transmission and the coordinated multi-point transmission can be recalculated accordingly.

In an embodiment of the present invention, for the single cell transmission, the SINR can be estimated as for example:

$$SINR_{i,0} = \frac{\sigma_{i,0}^2}{I_{out,i} + I_{in,i,0}} \quad \text{(Equation 7)}$$

For the coordinated multi-point transmission, the SINR can be estimated as for example:

$$SINR_i = \frac{\sigma_i^2}{I_{out,i} + I_{in,i,1}} \quad \text{(Equation 8)}$$

As mentioned hereinabove, the CQI and SINR have a mapping relationship therebetween, and thus the modified SINR can be mapped into a corresponding CQI.

In such a way, the CQI can be estimated, the CoMP gain is obtained with no overhead introduced, and more importantly, it requires no any modification to the current available UEs, which means that it is compatible with current UE implementation.

Hereinbelow, other embodiments of the present invention will be described at length with reference to FIG. 6 which schematically illustrates a flow chart of a method for estimating channel quality information according to another embodiment of the present invention.

Figure 6:
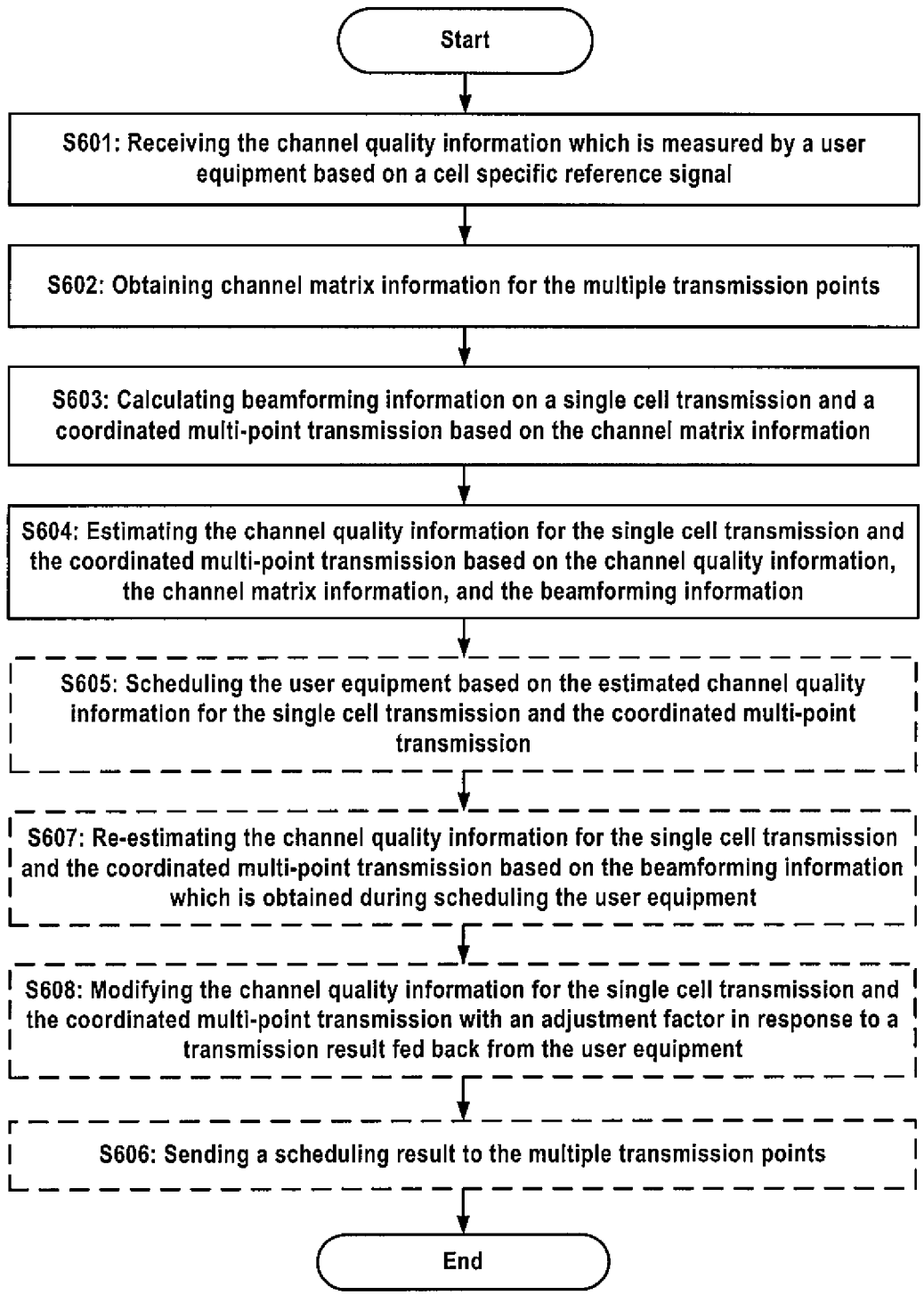
FIG. 6 schematically illustrates a flow chart of a method for estimating channel quality information according to another embodiment of the present invention.

As illustrated in FIG. 6, the operations of steps S601 to S604 are identical to those of steps S401 to S404 as shown in FIG. 4; however, the method as shown in FIG. 6 can further comprise the operation of scheduling the user equipment based on the estimated channel quality information for the single cell transmission and the coordinated multi-point transmission as shown in step S605 and the operation of sending a scheduling result to the multiple transmission points as shown in step S606. In such a way, the scheduling can be performed based on the modified CQI and the respective transmission points can transmit the packets based on the scheduling result.

Additionally, during the scheduling process, the eNB can learn the actual beamforming information, especially the beamforming matrix information, thus the channel quality information for the single cell transmission and the coordinated multi-point transmission can be re-estimated based on the beamforming information which is obtained during scheduling the user equipment as shown in step S607. Particularly, the noises and interferences from the inside of the macro cell for the single cell transmission and the coordinated multi-point transmission can be re-calculated based on the beamforming information obtained during the scheduling process, and then the SINR for the single cell transmission and the coordinated multi-point transmission can be re-estimated based on the re-estimated noises and interferences from the inside of the macro cell. In such a way, the CQI will be more accurate and the possibility of the failure of transmissions will be further reduced.

Furthermore, the channel quality information for the single cell transmission and the coordinated multi-point transmission can be further modified in response to a transmission result fed back from the user equipment as shown in step S608. In response to the transmission result such ACK or NACK, an adjustment factor can be used to modify the CQI. For example, if NACK is fed back, which means the CQI is over-estimated, the CQI can be reduced by the adjustment factor, and the factor can be a scaling factor, or a fixed value. In case that an ACK is fed back, which means CQI might be underestimated, the CQI can be increased by the adjustment factor such as the scaling factor or the fixed value. In such a way, it can further obtain more accurate CQI.

To show the effect of the present invention, the present inventors have performed some simulations on the embodiments of the present invention. The following table shows the simulation assumption or simulation scenario.

TABLE 1

Simulation Assumptions

| | Parameter | Assumption Used for Simulation |
|---|---|---|
| 1 | deployment scenario | CoMP scenario 4 in 3GPP TR 36.819 |
| 2 | duplex method and bandwidths | TDD: 10 MHz |
| 3 | cell layout | Hexagonal grid 19 sites, 3 cells per site, 1 cell with N low-power nodes as starting points. N = 30 for HetNet configuration 4b |
| 4 | number of low-power node per macro-cell | 4 |
| 5 | antenna configuration (macro node and low-power node) | value for combinations (number of antennas at macro node, number of antennas at low-power node) is (8, 2) 8 Tx antennas for Macro, cross-polarized: X 2 Tx antennas for LPN, cross-polarized: X |
| 6 | antenna configuration (UE) | 2 RX cross-polarized |
| 7 | Traffic | Full-buffer |
| 8 | downlink scheduler | proportional fair in time and frequency |
| 9 | TDD uplink downlink configuration | 1 |
| 10 | CoMP scheme | joint transmission |
| 11 | cooperation set RSSP threshold | 3 dB |
| 12 | maximum number of coordinated points | 3 |
| 13 | downlink receiver type | LMMSE |
| 14 | overhead | 0.3333 (CRS scheme) 0.3651 (CSI-RS scheme) |

Under the above simulation assumptions, it can obtain the following simulation results shown in table 2.

TABLE 2

Simulation Results

| | Scheme Description | Cell Average Throughput (bps/Hz) | Edge throughput (bps/Hz) |
|---|---|---|---|
| 1 | SU-MIMO w/o CQI modification (prior art 1) | 12.211 | 0.036 |
| 2 | SU-MIMO w/ CQI modification | 12.643 (+3.5%) | 0.045 (+25%) |
| 3 | COMP (prior art 2) | 11.399 (−6.7%) | 0.055 (+52.7%) |
| 4 | COMP w/ CQI modification | 11.417 (−6.5%) | 0.061 (+69.4%) |

Figure 1:
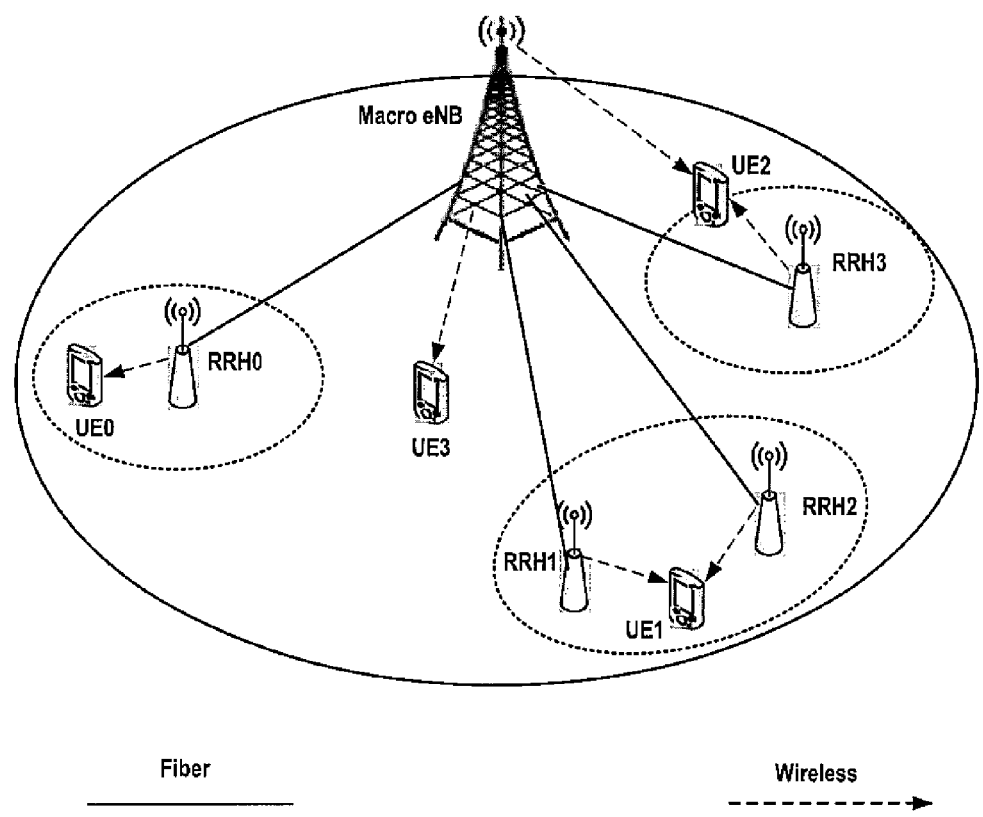
FIG. 1 schematically illustrates a diagram of a system structure under scenario 4 in the prior art.
Figure 2A:
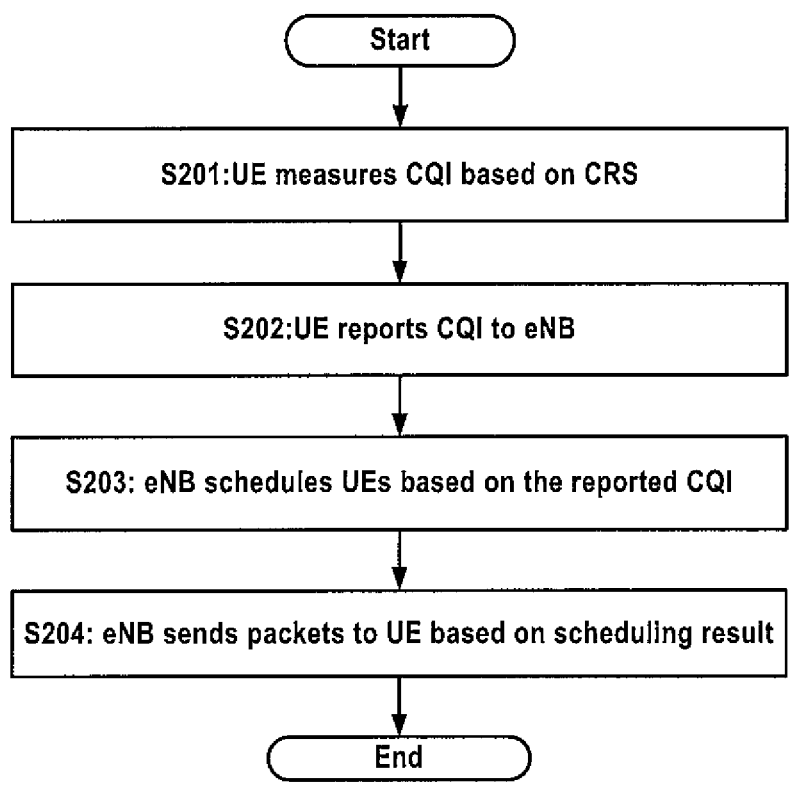
FIG. 2A schematically illustrates a flow chart of a procedure for UE channel measurement and eNB scheduling in the prior art.
Figure 2B:
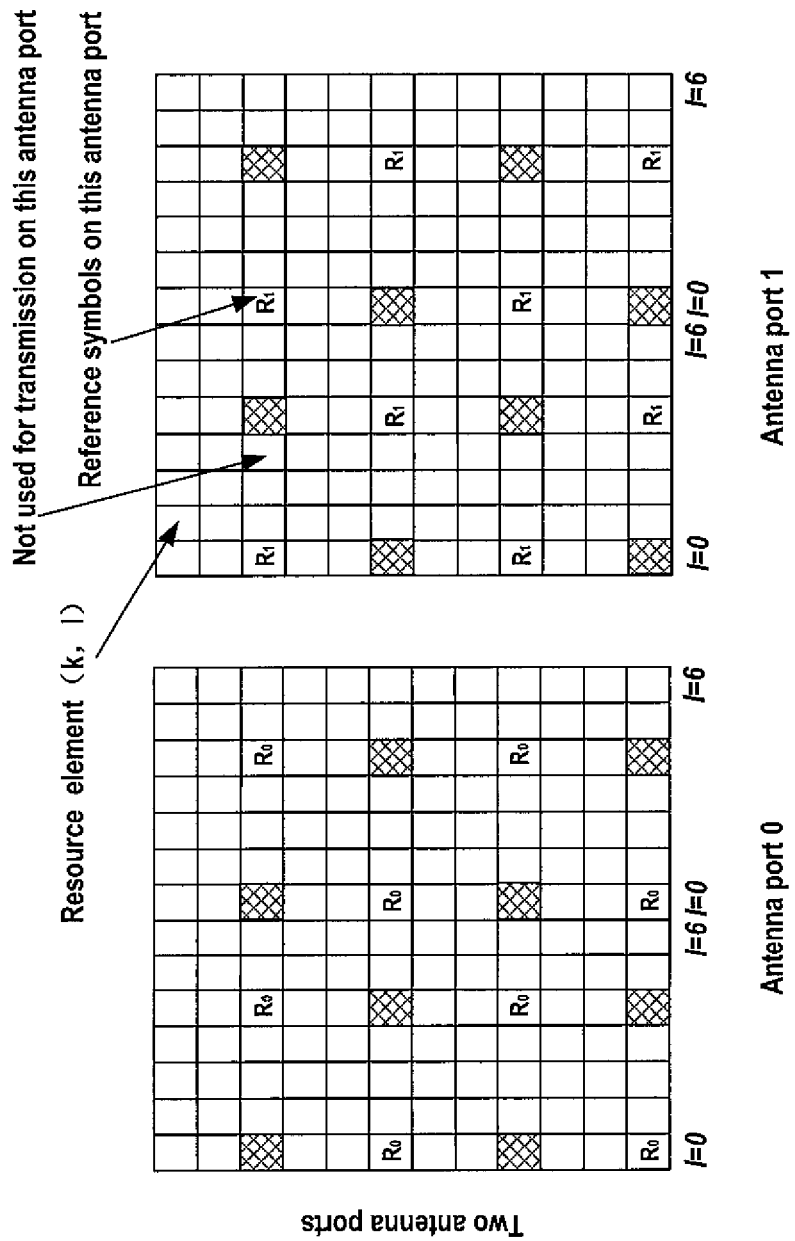
FIG. 2B schematically illustrates a diagram of mapping of downlink cell specific reference signals for two antenna ports and normal CP.
Figure 3A:
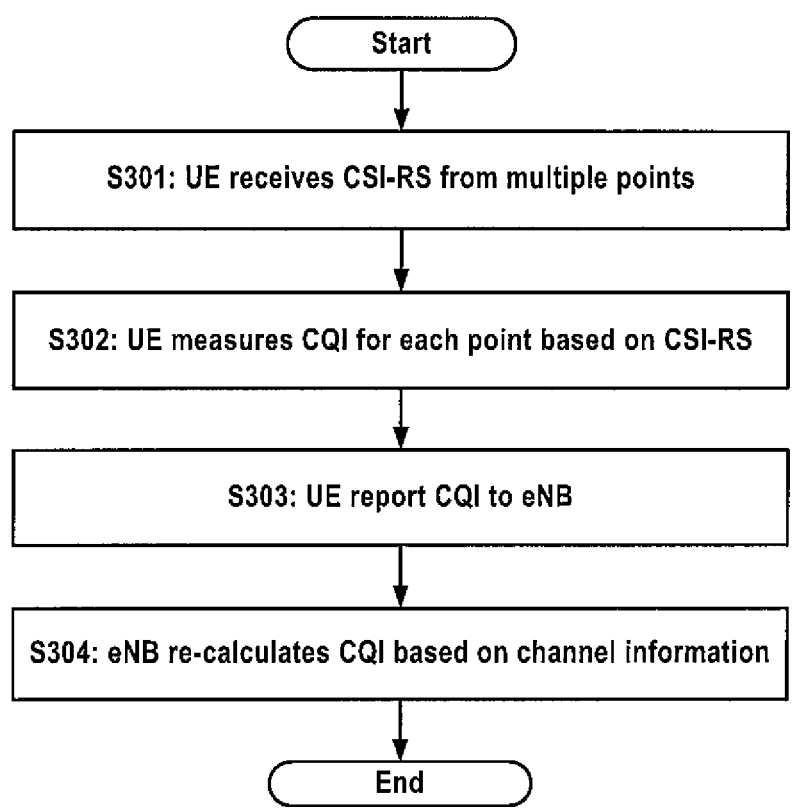
FIG. 3A schematically illustrates a flow chart of another procedure for UE channel measurement and CQI-recalculation in the prior art.
Figure 3B:
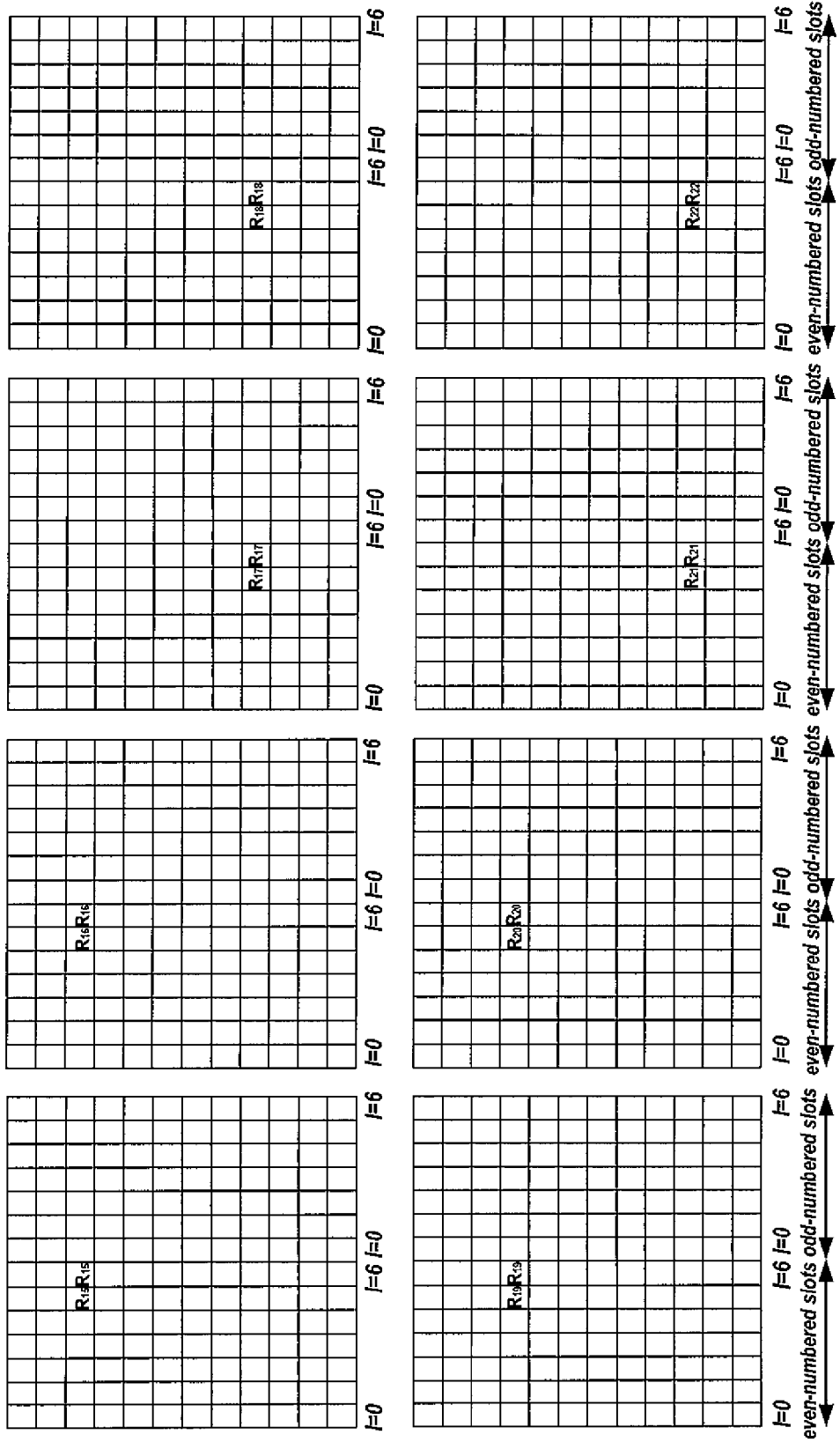
FIG. 3B schematically illustrates a diagram of mapping of CSI-RS for eight antenna ports, CSI configuration 0 and normal CP.

In the table 2, scheme 1 "SU-MIMO w/o CQI modification" denotes the solution described in the background of the present invention with reference to FIG. 2A; scheme 2 "SU-MIMO w/CQI modification" denotes the solution in which only the CQI for the single cell transmission is estimated according to the present invention; scheme 3 "COMP" denotes the solution described in the background of the present invention with reference to FIG. 3A; scheme 4 "COMP w/CQI modification" denotes the solution in which the CQIs for both the single cell transmission and the coordinated multi-point transmission are estimated according to the present invention. From the above table, it can be seen that, compared with scheme 1, scheme 2 achieve a 3.5% cell average throughout improvement and 25% edge throughput improvement; the cell average throughput of scheme 3 is reduced by −6.7% but the edge throughput thereof has increased by 52.7%; scheme 4 has 6.5% cell average throughput reduction but it achieve more great edge throughput improvement (69.4%).

Additionally, compared to the overhead based on CSI-RS scheme; the overhead based on CRS scheme achieve an overhead reduction. The following contents shows the process of the overhead analysis:

Overhead Analysis:

TDD(Configuration 1: DSUUDDSUUD)

All REs per RB/10 ms=12 subcarriers×14 OFDM-symbols×6 subframes=1008REs/10 ms;

PDCCH (Normal)=12 subcarriers×3 OFDM-symbols×4 subframes=144REs/10 ms;

PDCCH (Special)=12 subcarriers×2 OFDM-symbols×2 subframes=48REs/10 ms;

CRS=12 REs×6 subframes=72REs/10 ms;

DMRS=12ESs×6 subframes=72REs/10 ms;

CSI-RS(Macro)=16REs/10 ms; CSI-RS(LPN)=4REs/10 ms

Overhead based on CRS scheme=(144+48+72+72)/1008=0.3333

Overhead based on CSI-RS scheme=(144+48+72+72+16+4*4)/1008=0.3651(+9.5%)

Therefore, it can be seen from the above overhead analysis that the overhead based on CSI-RS scheme is about 9.5% more than that based on CRS scheme.

Accordingly, with the embodiments of the present invention, there is provided a solution for CQI estimation which is especially suitable for the scenario 4 mentioned in the background of the present invention, and additionally, it is possible to provide coordinated multi-point gains with no overhead introduced and, furthermore, it is compatible with the existing available user equipments.

Additionally, the present invention also provides an apparatus for estimating channel quality information. Hereinafter, reference will be made to FIGS. 7 to 9 to describe the apparatuses.

Figure 7:
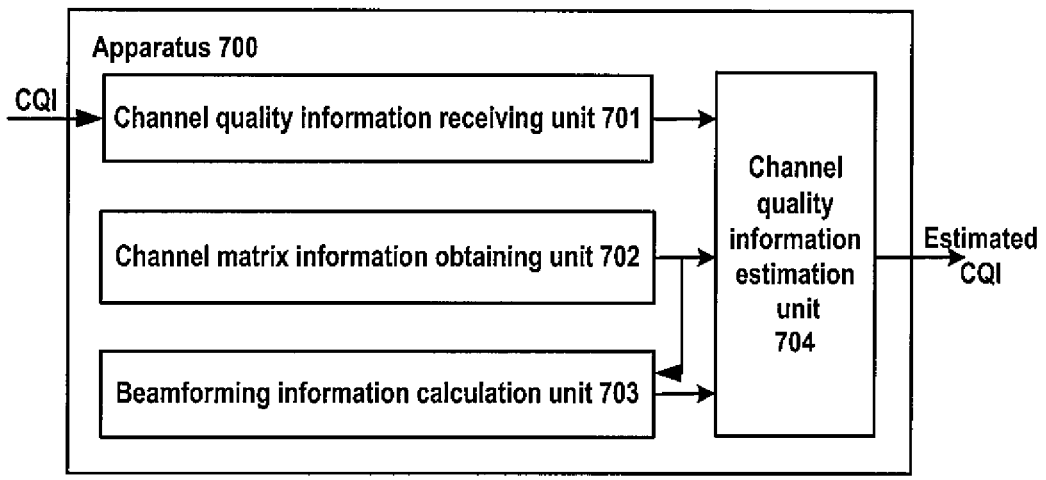
FIG. 7 schematically illustrates a block diagram of an apparatus for estimating channel quality information according to an embodiment of the present invention.

As illustrated in FIG. 7, the apparatus 700 for estimating channel quality information can comprise channel quality information receiving unit 701, channel matrix information obtaining unit 702, beamforming information calculation unit 703 and channel quality information estimation unit 704. In the apparatus 700, channel quality information receiving unit 701 can be configured to receive the channel quality information which is measured by a user equipment based on cell specific reference signal; channel matrix information obtaining unit 702 can be configured to obtain channel matrix information for the multiple transmission points; beamforming information calculation unit 703 can be configured to calculate beamforming information on a single cell transmission and a coordinated multi-point transmission based on the channel matrix information; and channel quality information estimation unit 704 can be configured to estimate the channel quality information for the single cell transmission and the coordinated multi-point transmission based on the channel quality information, the channel matrix information, and the beamforming information.

Figure 8:
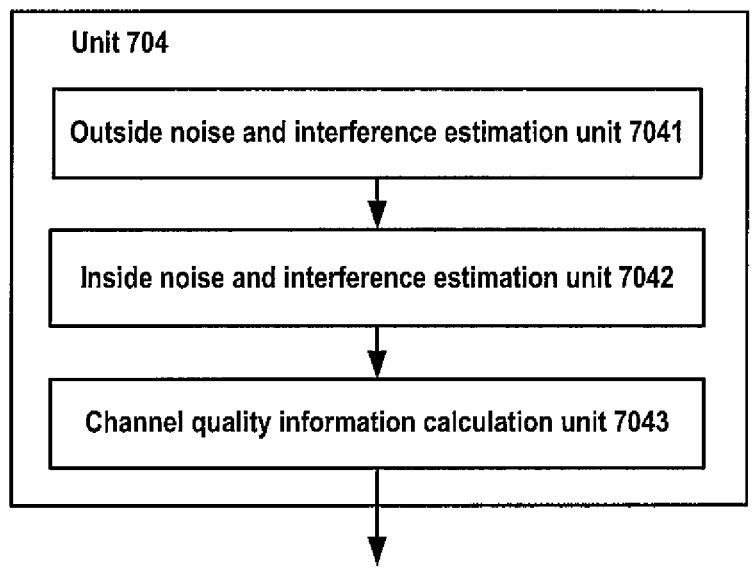
FIG. 8 schematically illustrates a block diagram of the channel quality information estimation unit according to an embodiment of the present invention.

In an embodiment of the present invention, the beamforming information can comprise the beamforming matrix information and the beamforming gain information, and as shown in FIG. 8, the channel quality information estimation unit 704 can comprise outside noise and interference estimation unit 7041, inside noise and interference estimation unit 7042 and channel quality information calculation unit 7043. In unit 704, outside noise and interference estimation unit 7041 can be configured to estimate the noise and interference from outside of the macro cell based on the channel quality information, the channel matrix information, and antenna virtualization matrix information for the multiple transmission points; inside noise and interference estimation unit 7042 can be configured to estimate the noises and interferences from the inside of the macro cell for the single cell transmission and the coordinated multi-point transmission based on the channel matrix information and the beamforming matrix information; and channel quality information calculation unit 7043 can be configured to calculate the channel quality information for the single cell transmission and the coordinated multi-point transmission based on the beamforming gain information, the noise and interference from the outside of the macro cell, and the noises and interferences from the inside of the macro cell for the single cell transmission and the coordinated multi-point transmission.

In another embodiments of the present invention, the apparatus 700 can further comprise a receive power information obtaining unit (not shown) configured to obtain receive power information on the multiple transmission points. In such a case, the channel matrix information can comprise the channel matrix normalized based on the receive power information relative to receive power of one of transmission points for the coordinated multi-point transmission.

In a further embodiment of the present invention, the one of the multiple transmission points can be a serving point of the user equipment which is selected from the multiple transmission points based on the receive power information.

In a still further embodiment of the present invention, apparatus 700 can further comprise a cooperating set determination unit (not shown) configured to determine a cooperating set of the user equipment for the coordinated multi-point transmission.

In a still yet further embodiment of the present invention, the cooperating set of the user equipment is determined based on receive power information on the multiple transmission points.

In another embodiment of the present invention, the channel matrix information obtaining unit 702 can be configured to receive the channel matrix information from the multiple transmission points, and wherein the channel matrix information can be measured by the multiple transmission points based on a sounding reference signal transmitted by the user equipment.

Figure 9:
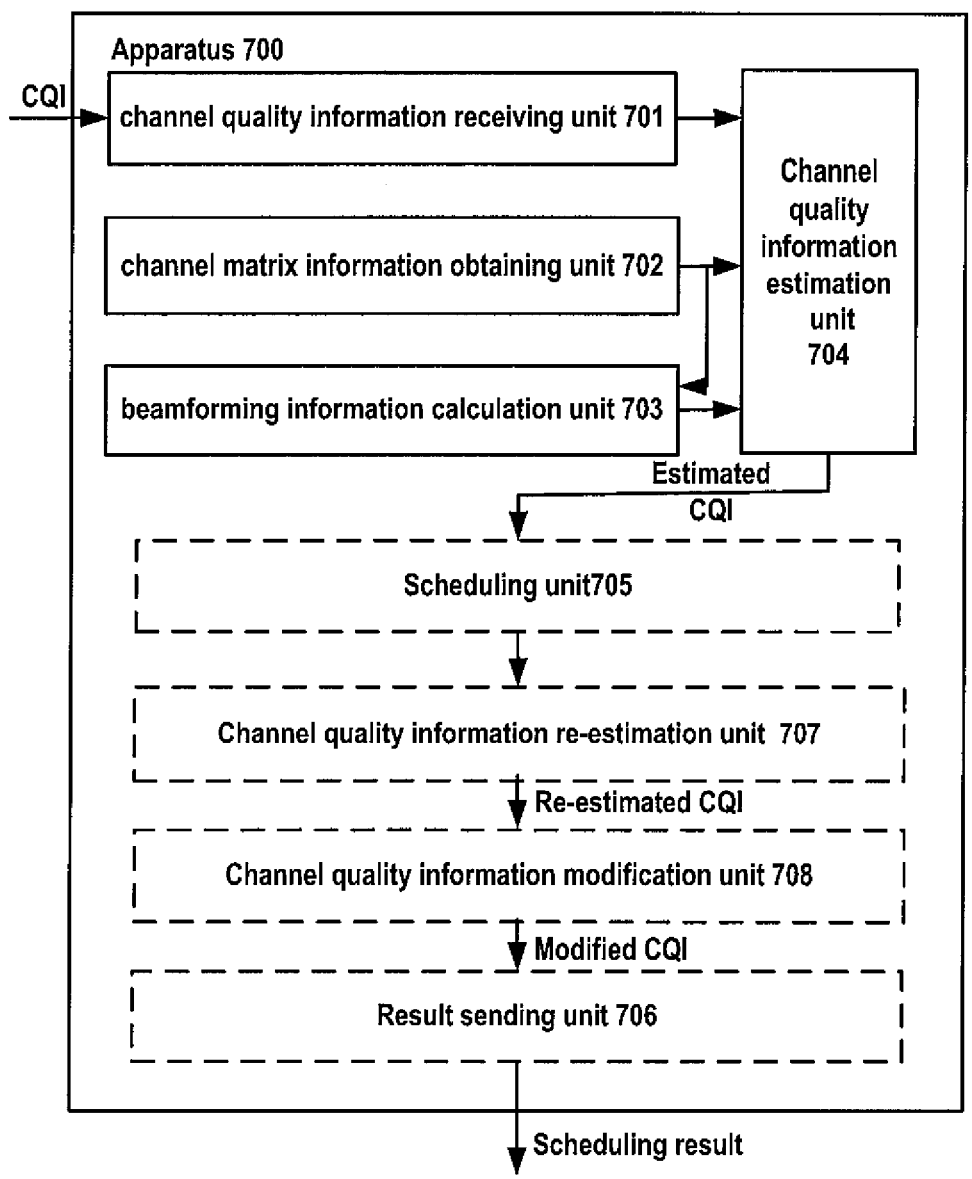
FIG. 9 schematically illustrates a block diagram of an apparatus for estimating channel quality information according to another embodiment of the present invention.

In a further embodiment of the present invention, apparatus 700 can further comprise scheduling unit 705 and result sending unit 706 as shown in FIG. 9. Scheduling unit 705 can be configured to schedule the user equipment based on the estimated channel quality information for the single cell transmission and the coordinated multi-point transmission; and result sending unit 706 can be configured to send a scheduling result to the multiple transmission points.

In a still further embodiment of the present invention, apparatus 700 can further comprise channel quality information re-estimation unit 707 as shown in FIG. 9. The channel quality information re-estimation unit 707 can be configured to re-estimate the channel quality information for the single cell transmission and the coordinated multi-point transmission based on the beamforming information which is obtained during scheduling the user equipment.

In a still further embodiment of the present invention, apparatus 700 can further comprise channel quality information modification unit 708 as shown in FIG. 9. The channel quality information modification unit 708 can be configured to modify the channel quality information for the single cell transmission and the coordinated multi-point transmission with an adjustment factor in response to a transmission result fed back from the user equipment.

In addition, the present invention further provides a base station, which comprises the apparatus 700 according to any one of embodiments of the present invention described hereinabove.

Additionally, the present invention provides a network central processing device, which comprises the apparatus 700 according to any one of embodiments of the present invention described hereinabove.

Besides, it should be noted that operations of respective units as comprised in the apparatus 700 with reference to FIGS. 7 to 9 substantially correspond to operations in respective method steps as previously described. Therefore, for detailed operations of respective units in the apparatus 700, please refer to the previous descriptions of the methods of the present invention with reference to FIGS. 4 to 6.

It should be noted that in the embodiments of the present invention described above, the macro eNB is described as the device for estimating the CQI, however, the skilled in the art can readily understand that any network central processing device can also serve as the device for estimating CQI.

Moreover, it should be noted that in the above description, the channel matrices are normalized relative to one of the transmission points in the cooperating set; however, as mentioned above, this is a preferable solution and it is also possible to perform the method without the normalization.

By far, the present invention has been described with reference to the accompanying drawings through particular preferred embodiments. However, it should be noted that the present invention is not limited to the illustrated and provided particular embodiments, but various modification may be made within the scope of the present invention.

Further, the embodiments of the present invention can be implemented in software, hardware or the combination thereof. The hardware part can be implemented by a special logic; the software part can be stored in a memory and executed by a proper instruction execution system such as a microprocessor or a dedicated designed hardware. Those normally skilled in the art may appreciate that the above method and system can be implemented with a computer-executable instructions and/or control codes contained in the processor, for example, such codes provided on a bearer medium such as a magnetic disk, CD, or DVD-ROM, or a programmable memory such as a read-only memory (firmware) or a data bearer such as an optical or electronic signal bearer. The apparatus and its components in the present embodiments may be implemented by hardware circuitry, for example a very large scale integrated circuit or gate array, a semiconductor such as logical chip or transistor, or a programmable hardware device such as a field-programmable gate array, or a programmable logical device, or implemented by software executed by various kinds of processors, or implemented by combination of the above hardware circuitry and software, for example by firmware.

Though the present invention has been described with reference to the currently considered embodiments, it should be appreciated that the present invention is not limited to the disclosed embodiments. On the contrary, the present invention is intended to cover various modifications and equivalent arrangements falling within in the spirit and scope of the appended claims. The scope of the appended claims is accorded with the broadest explanations and covers all such modifications and equivalent structures and functions.

What is claimed is:

1. A method of estimating channel quality information, wherein a macro cell includes multiple transmission points, the method comprising:
   receiving the channel quality information which is measured by a user equipment based on a cell specific reference signal;
   obtaining channel matrix information for the multiple transmission points;
   calculating beamforming information on a single cell transmission and a coordinated multi-point transmission based on the channel matrix information; and
   estimating the channel quality information for the single cell transmission and the coordinated multi-point transmission based on the channel quality information, the channel matrix information, and the beamforming information,
   wherein the beamforming information comprises beamforming matrix information and beamforming gain information, and
   wherein the estimating the channel quality information for the single cell transmission and the coordinated multi-point transmission comprises:
   estimating noise and interference from outside of the macro cell based on the channel quality information, the channel matrix information, and antenna virtualization matrix information for the multiple transmission points;
   estimating noises and interferences from the inside of the macro cell for the single cell transmission and the coordinated multi-point transmission based on the channel matrix information and the beamforming matrix information; and
   calculating the channel quality information for the single cell transmission and the coordinated multi-point transmission based on the beamforming gain information, the noise and interference from the outside of the macro cell, and the noises and interferences from the inside of the macro cell for the single cell transmission and the coordinated multi-point transmission.

2. The method of claim 1, further comprising:
   obtaining receive power information on the multiple transmission points; and
   wherein the channel matrix information comprises the channel matrix normalized based on the receive power information relative to receive power of one of transmission points for the coordinated multi-point transmission.

3. The method of claim 2, wherein the one of the multiple transmission points is a serving point of the user equipment which is selected from the multiple transmission points based on the receive power information.

4. The method of claim 1, further comprising:
   determining a cooperating set of the user equipment for the coordinated multi-point transmission.

5. The method of claim 4, wherein the cooperating set of the user equipment is determined based on receive power information on the multiple transmission points.

6. The method of claim 1, wherein the obtaining channel matrix information on the multiple transmission points comprises:
   receiving the channel matrix information from the multiple transmission points, and wherein the channel matrix information is measured by the multiple transmission points based on a sounding reference signal transmitted by the user equipment.

7. The method of claim 1, further comprising:
   scheduling the user equipment based on the estimated channel quality information for the single cell transmission and the coordinated multi-point transmission; and
   sending a scheduling result to the multiple transmission points.

8. The method of claim 7, further comprising:
   re-estimating the channel quality information for the single cell transmission and the coordinated multi-point transmission based on the beamforming information which is obtained during scheduling the user equipment.

9. The method of claim 1, further comprising:
   modifying the channel quality information for the single cell transmission and the coordinated multi-point transmission with an adjustment factor in response to a transmission result fed back from the user equipment.

10. An apparatus for estimating channel quality information, wherein a macro cell includes multiple transmission points, the apparatus comprising:
    channel quality information receiving unit for receiving the channel quality information which is measured by a user equipment based on a cell specific reference signal;
    channel matrix information obtaining unit for obtaining channel matrix information for the multiple transmission points;
    beamforming information calculation unit for calculating beamforming information on a single cell transmission and a coordinated multi-point transmission based on the channel matrix information; and
    channel quality information estimation unit for estimating the channel quality information for the single cell transmission and the coordinated multi-point transmission based on the channel quality information, the channel matrix information, and the beamforming information,
    wherein the beamforming information comprises beamforming matrix information and beamforming gain information, and
    wherein the channel quality information estimation unit comprises:
    outside noise and interference estimation unit for estimating noise and interference from outside of the macro cell based on the channel quality information, the channel matrix information, and antenna virtualization matrix information for the multiple transmission points;
    inside noise and interference estimation unit for estimating noises and interferences from the inside of the macro cell for the single cell transmission and the coordinated multi-point transmission based on the channel matrix information and the beamforming matrix information; and channel quality information calculation unit for calculating the channel quality information for the single cell transmission and the coordinated multi-point transmission based on the beamforming gain information, the noise and interference from the outside of the macro cell, and the noises and interferences from the inside of the macro cell for the single cell transmission and the coordinated multi-point transmission.

11. The apparatus of claim 10, further comprising:

receive power information obtaining unit for obtaining receive power information on the multiple transmission points; and wherein the channel matrix information comprises the channel matrix normalized based on the receive power information relative to receive power of one of transmission points for the coordinated multi-point transmission.

12. The apparatus of claim 11, wherein the one of the multiple transmission points is a serving point of the user equipment which is selected from the multiple transmission points based on the receive power information.

13. The apparatus of claim 10, further comprising:

cooperating set determination unit for determining a cooperating set of the user equipment for the coordinated multi-point transmission.

14. The apparatus of claim 13, wherein the cooperating set of the user equipment is determined based on receive power information on the multiple transmission points.

15. The apparatus of claim 10, wherein the channel matrix information obtaining unit is configured for:

receiving the channel matrix information from the multiple transmission points, and wherein the channel matrix information is measured by the multiple transmission points based on a sounding reference signal transmitted by the user equipment.

16. The apparatus of claim 10, further comprising:

scheduling unit for scheduling the user equipment based on the estimated channel quality information for the single cell transmission and the coordinated multi-point transmission; and result sending unit for sending a scheduling result to the multiple transmission points.

17. The apparatus of claim 16, further comprising:

channel quality information re-estimation unit for re-estimating the channel quality information for the single cell transmission and the coordinated multi-point transmission based on the beamforming information which is obtained during scheduling the user equipment.

18. The apparatus of claim 10, further comprising:

channel quality information modification unit for modifying the channel quality information for the single cell transmission and the coordinated multi-point transmission with an adjustment factor in response to a transmission result fed back from the user equipment.

19. A base station, comprising the apparatus of claim 10.

20. A network central processing device, comprising the apparatus of claim 10.

* * * * *